US008732161B2

(12) United States Patent
Jain et al.

(10) Patent No.: US 8,732,161 B2
(45) Date of Patent: May 20, 2014

(54) EVENT BASED ORGANIZATION AND ACCESS OF DIGITAL PHOTOS

(75) Inventors: Ramesh Jain, Irvine, CA (US); Gerd Utz Westermann, Oldenburg (DE); Ansgar Scherp, Irvine, CA (US); Srikanth Agaram, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 1307 days.

(21) Appl. No.: 12/110,010

(22) Filed: Apr. 25, 2008

(65) Prior Publication Data

US 2009/0319472 A1    Dec. 24, 2009

Related U.S. Application Data

(60) Provisional application No. 60/914,578, filed on Apr. 27, 2007.

(51) Int. Cl.
*G06F 17/30* (2006.01)

(52) U.S. Cl.
USPC ..... 707/716; 707/713; 707/715; 707/E17.009

(58) Field of Classification Search
USPC .......................................... 707/716, 713, 715
See application file for complete search history.

(56) References Cited

U.S. PATENT DOCUMENTS

| 2005/0125371 A1* | 6/2005 | Bhide et al. ........................ 707/1 |
| 2007/0053513 A1* | 3/2007 | Hoffberg ....................... 380/201 |
| 2007/0291117 A1* | 12/2007 | Velipasalar et al. .......... 348/152 |

OTHER PUBLICATIONS

U. Westermann and Ramesh Jain, "Toward a Common Event Model for Multimedia Applications", IEEE MultiMedia Journal 14(1), 19-29 (2007), IEEE Computer Society Press.
J. Gemmell, L. Williams, K. Wood, R. Lueder, and G. Bell, "Passive capture and ensuing issues for a personal lifetime store", Proc. of the 1st ACM workshop on Continuous archival and retrieval of personal experiences; New York, NY, USA, 48-55 (2004), ACM Press.
J. Gemmell, G. Bell, and R. Lueder, "MyLifeBits: a personal database for everything", Commun. ACM 49(1), (2006), ACM Press. [Also published as Microsoft Technical Report MSR-TR-2006-23].
J. Gemmell, A. Aris, and R. Lueder, "Telling stories with MyLifeBits", presentation at IEEE International Conference on Multimedia and Expo Amsterdam, Netherlands, Jul. (2005).

(Continued)

*Primary Examiner* — Shyue Jiunn Hwa
(74) *Attorney, Agent, or Firm* — Shimokaji & Associates P.C.

(57) ABSTRACT

Architecture and its implementation of an event-based media management system and method are disclosed. A generic model for events is used for developing architecture for media management, called Eventcentric Media Management (EMMa) system. The system focuses on event experiences and provides flexible functionality for media management. The system and method analyze cross-media files for features to extract atomic events and apply algorithms to cluster files including similar or related features. Thus, the EMMa system allows unified media indexing of multiple media types, better abstraction of the real world, use of context, media processing operations to compute and store features and tags, and a more intuitive support for multiple users. It provides environments for querying and browsing media related to events and authoring of multimedia presentations for sharing with other individuals.

17 Claims, 13 Drawing Sheets

ARCHITECTURE OF THE EVENT - CENTRIC MEDIA MANAGEMENT APPLICATION

(56) References Cited

OTHER PUBLICATIONS

M. Naaman, R. B. Yeh, H. Garcia-Molina, and A. Paepcke, "Leveraging context to resolve identity in photo albums", Proc. of the 5th ACM/IEEE-CS joint conference on Digital libraries; Denver, CO, USA, (2005), ACM Press.

S. Ahern, M. Naaman, R. Nair, J. Yang, "World Explorer: Visualizing Aggregate Data from Unstructured Text inGeo-Referenced Collections", ACM/IEEE-CS Joint Conference on Digital Libraries; Vancouver, Canada, Jun. (2007).

B. N. Lee and W. C. and E. Y. Chang, "Fotofiti: web service for photo management", Multimedia presentation, Santa Barbara, CA, USA, (2006).

B. Shneiderman and H. Kang, "Direct Annotation: A Drag-and-Drop Strategy for Labeling Photos", International Conference on Information Visualisation, (2000), IEEE Computer Society.

H. Kang and B. Shneiderman, "Visualization Methods for Personal Photo Collections: Browsing and Searching in the PhotoFinder", International Conference on Multimedia and Expo, New York City, NY, USA, Aug. (2000).

U. Westermann and R. Jain, "E—A Generic Event Model for Event-Centric Multimedia Data Management in eChronicle Applications", IEEE Int. Workshop on Electronic Chronicles, (2006).

T. J. Mills, D. Pye, D. Sinclair, and K. R. Wood, "ShoeBox: A Digital Photo Management System", AT&T Laboratories Cambridge, (2000).

K. Rodden and K. R. Wood, "How do People manage their Digital Photographs?", Conference on Human Factors and Computing Systems, (2003), ACM Press.

L. Wenyin, Y. Sun, and H. Zhang, "MiAlbum—A system for home photo management using the semi-automatic image annotation approach", Multimedia, Marina del Rey, California, USA, (2000), ACM Press.

J. C. Platt, "AutoAlbum: Clustering Digital Photographs using Probabilistic Model Merging", IEEE Workshop on Content-based Access of Image and Video Libraries, (2000), IEEE Computer Society Press.

T. Tan, J. Chen, P. Mulhem,and M. Kankanhalli, "SmartAlbum: a multi-modal photo annotation system", Multimedia, Juan-les-Pins, France, (2002), ACM Press.

F. Bentley, C. Metcalf, and G. Harboe, "Personal vs. commercial content: the similarities between consumer use of photos and music", CHI, Montreal, Quebec, Canada, (2006).

B. Gandhi, A. Martinez, F. Bentley, "Intelligent multimedia content management on mobile devices", Multimedia and Expo, (2004), IEEE Computer Society Press.

G.S. Pingali, A. Opalach, Y.D. Jean, and I.B. Carlbom, "Instantly indexed multimedia databases of real world events", IEEE Transactions on Multimedia, 4(2), (2002).

R. Jain, P. Kim, and Z. Li, "Experiential meeting system", ACM SIGMM workshop on experiential telepresence, Berkeley, California, USA, (2003).

U. Westermann, S. Agaram, B. Gong, and Ramesh Jain, "Event-centric multimedia data management for reconnaissance mission analysis and reporting", Multimedia, (2006), ACM Press.

B. Gong, R. Singh, and Ramesh Jain, "ResearchExplorer. Gaining Insights through Exploration in Multimedia Scientific Data", ACM SIGMM Int. workshop on Multimedia information retrieval, (2004), ACM Press.

Y. Wang and Y. Wang, "Cognitive Models of the Brain", Proc. of the 1st IEEE Int. Conf. on Cognitive Informatics, (2002), IEEE Computer Society Press.

R. Casati and A. Varzi, "Events", Stanford Encyclopedia of Philosophy, (2007), URL: http://plato.stanford.edu/ entries/events/.

P. Appan and H. Sundaram, "Networked multimedia event exploration", Multimedia, (2004), ACM Press.

P. Kim, M. Podlaseck, and G. Pingali, "Personal chronicling tools for enhancing information archival and collaboration in enterprises", Continuous archival and retrieval of personal experiences, (2004), ACM Press.

P. Terenziani and R. T. Snodgrass, "Reconciling Point-Based and Interval-Based Semantics in Temporal Relational Databases: A Treatment of the Telic/Atelic Distinction", IEEE Transactions in Knowledge and Data Engineering 5(16), May (2004).

R. Jain, P. Kim, and Z. Li, "Experiential meeting system", Workshop on Experiential telepresence, Berkeley, California, (2003), ACM Press.

Technical Standardization Committee on AV & IT Storage Systems and Equipment, "Exchangeable image file format for digital still cameras: EXIF", Version 2.2, (2002), URL: http://www.exif.org/specifications.html.

R. M. Lerner, "At the forge: working with activeRecord", Linux J., Nr. 140, (2005).

D. Thomas, D. H. Hansson, L. Breedt, M. Clark, J. D. Davidson, J. Gehtland, and A. Schwarz, "Agile Web Development with Rails", Pragmatic Bookshelf, (2006).

W3C, "Web Services Description Language", Mar. (2001), URL http://www.w3.org/TR/wsdl/.

W3C, "Synchronized Multimedia Integration Language", Aug. (2001), URL http://www.w3.org/TR/smil20/.

W3C, "Scalable Vector Graphics", Oct. (2004), URL http://www.w3.org/TR/2004/WD-SVG12-20040510/.

Adobe Systems, "Flash Professional 8", (2007), URL http://www.macromedia.com/software/flash/flashpro/.

J. R. Smith and S.-F. Chang, "VisualSEEk: A fully automated content-based image query system", Multimedia, (1996), ACM Press.

A.W.M. Smeulders, M. Worring, S. Santini, A. Gupta, and R. Jain, "Content-based image retrieval at the end of the early years", IEEE Trans. on PAMI, vol. 22, (2000), ACM Press.

M. Davis and R. Sarvas, "Mobile Media Metadata for Mobile Imaging", International Conference on Multimedia and Expo, Special Session on Mobile Imaging in Taipei, Taiwan, IEEE Computer Society Press, (2004).

A. Graham et al, "Time as Essence for photo browsing through personal digital libraries", JCDL, (2002).

B. Gong, U. Westermann, S. Agaram, and R. Jain, "Event Discovery in Multimedia Reconnaissance Data Using Spatio-Temporal Clustering", AAAI Workshop on Event Extraction and Synthesis, (2006).

K. Munroe, B. Ludäscher, and Y. Papakonstantinou, "BBQ: Blended Browsing and Querying of XML in a Lazy Mediator System", Int. Conf. on Extending Database Technology, Mar. (2005).

A. Scherp, "A Component Framework for Personalized Multimedia Applications", OlWIR, Oldenburg, Germany, Feb. (2007). PhD Thesis, http://ansgarscherp.net/dissertation/.

A. Scherp and R. Jain, "Towards an ecosystem for semantics", Workshop on multimedia information retrieval on the many faces of multimedia semantics, Augsburg, Bavaria, Germany, (2007), ACM Press.

A. Scherp and S. Boll, "Paving the Last Mile for Multi-Channel Multimedia Presentation Generation", Multi Media Modeling, Y.-P. P. Chen (ed.), Jan. (2005), IEEE Computer Society.

A. Scherp and S. Boll, "MM4U—A framework for creating personalized multimedia content", In: Managing Multimedia Semantics, S. Nepal and U. Srinivasan (ed.), (2005), Idea Group Publishing.

A. Scherp and S. Boll, "Context-driven smart authoring of multimedia content with xSMART", ACM Int. Conf. on Multimedia, (2005), ACM Press.

S. Boll and U. Westermann, "MediÆther: an event space for context-aware multimedia experiences", Workshop on Experiential telepresence, Berkeley, California, (2003).

ACD Systems, USA. ACDSee 9.0, 2006. http://www.acdsystems.com/products/acdsee.

Apple Inc., USA. iPhoto, 2002. http://www.apple.com/iphoto/.

Corel Corporation, USA. Corel Photo Album 6.0, 2007. http://www.corel.com/.

DVMLAB—Columbia University. Visualseek—a joint spatial-feature image search engine, 2007. http://www.ee.columbia.edu/ln/dvmm/researchProjects/MultimediaIndexing/VisualSEEk/VisualSEEk.htm.

Eastman Kodak Company, USA. Kodak Easy Share Gallery. http://www.kodakgallery.com/.

(56) References Cited

OTHER PUBLICATIONS

Fast Search and Transfer Company, Norway. All the Web, 1999. http://www.alltheweb.com/.
Google Inc., USA. Google Search, 1998. http://www.google.com/.
Google Inc., USA. Youtube, 2005. http://www.youtube.com/.
Google Inc., USA. Google Video, 2006. http://video.google.com/.
Google Inc., USA. Picasa 2.6.0, 2007. http://picasa.google.com/.
A. Loui and A. Savakis. Automatic image event segmentation and quality screening for albuming applications. In IEEE Int. Conf. on Multimedia and Expo, 2000.
Microsoft Corporation, USA. Windows Live Search, 2006. http://www.live.com/.
MYSQL AB, Sweden. Mysql 5.0, 2006. http://www.mysql.com/.
Overture Services, Inc., USA. Altavista. http://www.altavista.com/.
J. Platt, M. Czerwinski, and B. Field. PhotoTOC:automatic clustering for browsing personal photographs. Technical report, Microsoft Research MSR-TR-2002-17, 2002.
C. Szyperski, D. Gruntz, and S. Murer. Component Software: Beyond Object-Oriented Programming. Addison-Wesley, 2nd edition, 2002.
The J. Paul Getty Trust, USA. Getty Thesaurus of Geographic Names, 2007. http://www.getty.edu/research/conducting_research/vocabularies/tgn/.
Yahoo! Inc., USA. Yahoo! Search, 2003. http://search.yahoo.com/.
Yahoo! Inc., USA. Flickr, 2004. http://www.flickr.com/.
Yahoo! Inc., USA. Yahoo! Photos, 2006. http://photos.yahoo.com/.

* cited by examiner

UML CLASS DIAGRAM OF THE GENERIC
EVENT MODEL

UML CLASS DIAGRAM OF THE ATOMIC
EVENT TYPE

UML CLASS DIAGRAM OF THE
COMPOSITES EVENT TYPE

UML CLASS DIAGRAM OF THE GENERIC EVENT MODEL E
SPECIALIZED FOR THE DOMAIN OF MEDIA MANAGEMENT

UML CLASS DIAGRAM OF THE COMMON DESCRIPTORS
OF EVENTS FOR MEDIA MANAGEMENT

UML CLASS DIAGRAM OF THE ATOMIC
PHOTO EVENT TYPE

UML CLASS DIAGRAM OF THE
BIRTHDAY PARTY TYPE

MEDIA EVENT MANAGEMENT CYCLE

ARCHITECTURE OF THE EVENT - CENTRIC MEDIA MANAGEMENT APPLICATION

INTERFACE PROTOTYPE OF THE LOCATION
VIEW OF THE EMMa APPLICATION

INTERFACE PROTOTYPE OF THE TIMELINE
VIEW OF THE EMMa APPLICATION

SCREENSHOT OF THE AUTHORING TOOL FOR MULTIMEDIA ALBUMS EMPLOYING MEDIA EVENTS

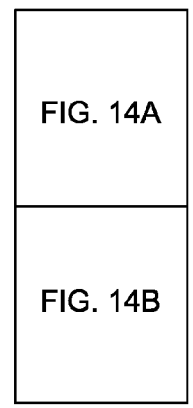
FIG. 14
FIG. 14A
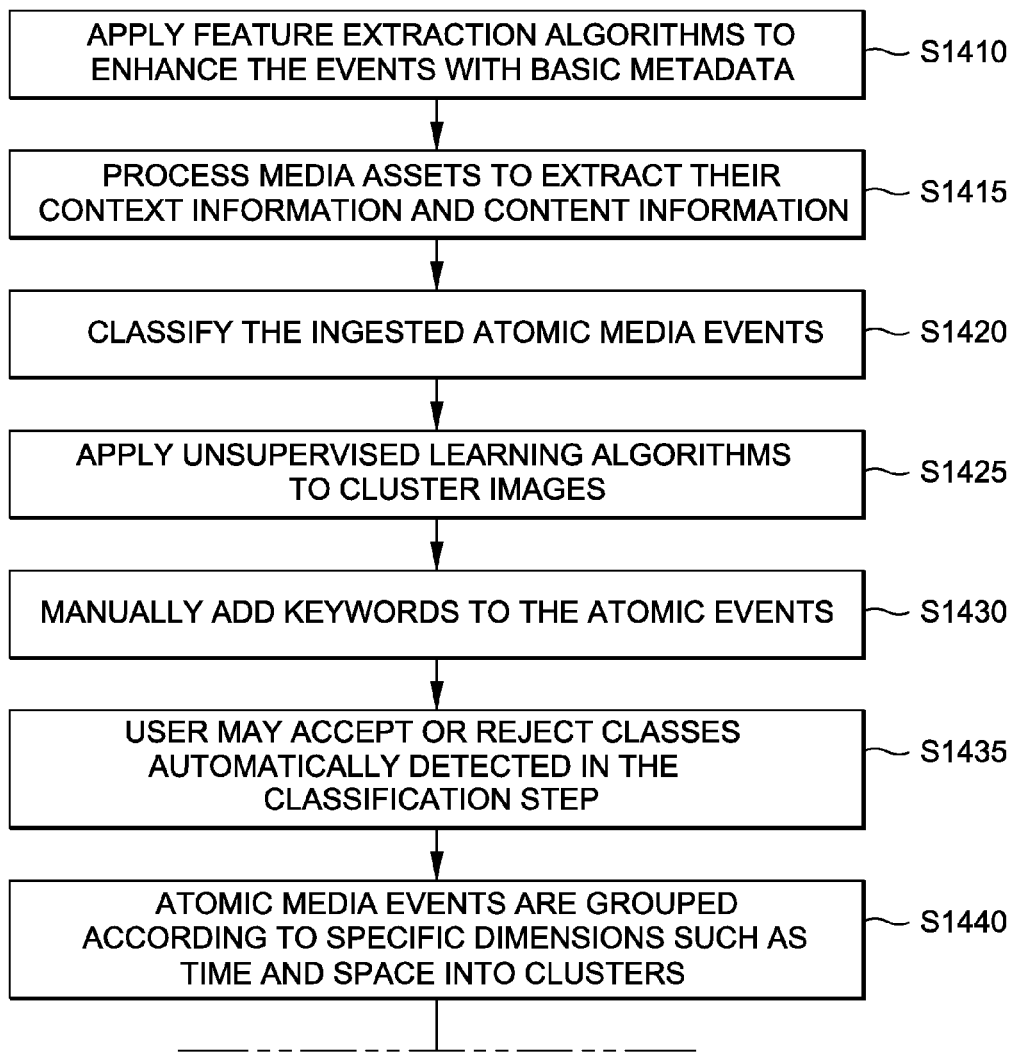

EVENT BASED ORGANIZATION AND ACCESS OF DIGITAL PHOTOS

CROSS-REFERENCE TO RELATED APPLICATION

This application claims benefit under 35 U.S.C. §119(e) of U.S. Provisional Application having Ser. No. 60/914,578 filed Apr. 27, 2007, which is hereby incorporated by reference herein in its entirety.

BACKGROUND OF THE INVENTION

The present invention relates generally to methods and systems for managing and presenting multimedia content.

Since the advent of digital cameras and cell phones with built-in cameras, the management of media assets has become an integral aspect of our daily life. It is known in the art to approach systems for organizing and sharing our experiences saved digitally by focusing on the media assets that accompany these experiences. Under some systems users can upload media assets, such as digital photographs, video recordings, and textual comments into electronic mediums and share them with other users. However, these and other systems for managing and sharing media assets remain media-centric. This means that they organize their users' experiences along the media-type assets captured. However, the media-centric approach suffers from limits on the overall flexibility and applicability of these systems.

It is also known in the art for many applications in the field of media management to support only one type of media. For example, software such as ACDSee, Corel Photo Album, and Picasa focus on managing photos. Similarly, systems like YouTube and Google Video support video.

The prior art has also shown support for searching text, image, and video. Some examples include the search engine applications from Google, Yahoo!, and Microsoft. These applications operate by searching for text, images, and videos separately. Thus, users must conduct independent searches to find different media and collate them as media-centric applications which lack a common indexing scheme.

Media-centric applications of the prior art have been used to decide the digital context of each media file considered independently. Many of these media management systems use a files and folders approach to organizing media data. Users of these systems organize, search, and browse back and forth through folders before viewing the media files. Some would consider this an inappropriate abstraction of the real world and human experiences as humans rather like to think in terms of events.

In a scenario where media assets are taken by different users at the same event, these assets share a common social context. For example, consider a group of people taking a trip together to New York. Each member of this group is individually taking photos during the trip and subsequently creating a photo album of the media assets. In a media-centric approach, one may struggle to combine the different users' photographs and experiences conveyed with the created photo albums. Important information about the social context is missing like the people that participated in the trip and the single events that happened during the trip.

Other applications may use tags to allow for searching through files, however, tags do not impose any structure on the organization and presentation of media, which limits their utility. In addition the multitude of tags can be considered individual folders making their use potentially more cumbersome. As users can search by tags, the resulting set contains images not only of that particular trip but of all images associated with the searched tags. Media organization systems have yet to focus on providing any support for unifying the common experiences of a group of users.

As can be seen, there is a need for an improved method and system for managing and presenting multimedia content employing an event-centric unified indexing of media independent of the media type.

SUMMARY OF THE INVENTION

In one aspect of the present invention a method of cataloguing media files for event-centric organization comprises scanning the media files for atomic events, applying feature extraction techniques to the atomic events to obtain context information and content information for each atomic event, classifying the atomic events into predetermined classes based on the extracted context and content information, and assembling sets of composite events from the classified atomic events.

In another aspect of the present invention, a system for organizing images comprises an event base database, a user database and a file system, at least two wrappers for abstracting data from at least one of the eventbase database, the user database, and the file system, a service layer for storing atomic events and composite events, retrieving events, deleting events, and updating events, and an application layer for programming an interface for clients to access event data and media data storage.

In yet another aspect of the present invention, a method for using an event-centric management architecture to retrieve digital images comprises analyzing media data from at least one source, organizing and storing the media data according to events into composite events, accessing a collection of composite events for display and browsing on a graphical user interface using an initial graphical presentation, performing a query-based search on the graphical user interface using predetermined dimensional tags to search for selected composite events, and using the events to retrieve digital images.

These and other features, aspects and advantages of the present invention will become better understood with reference to the following drawings, description and claims.

DETAILED DESCRIPTION OF THE INVENTION

Figure 1:
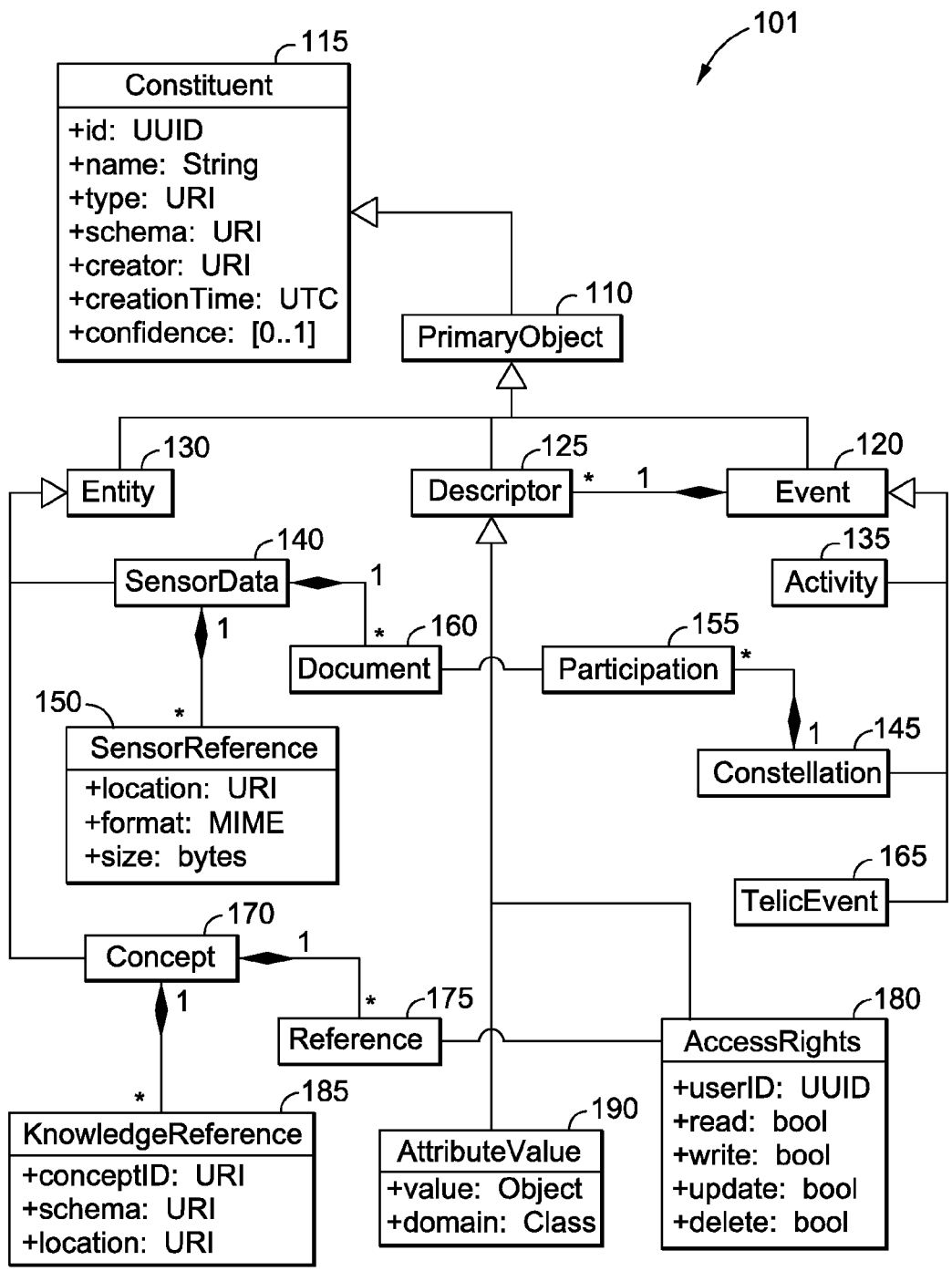
FIG. 1 is a UML (Unified Modeling Language) diagram of a generic event model according to the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides systems and methods for organizing multimedia files using an event-centric approach. The present invention may be used to organize and manage media files using event features extracted from the files. To achieve this kind of approach to media management, an Event-centric Media Management (EMMa) architecture is proposed for managing media assets. Events may be considered by some a natural for organizing and managing human experience and their accompanying media assets. The media assets captured during a specific event describe the experience and provide evidence that a specific event happened. The EMMa system supports multiple sources of different media data. The information collected from these sources may be organized and stored according to events. The user can then explore these events using a browsable interface including a searchable environment and use these events to author multimedia presentations. The interface provides multiple views for the different facets of events. The EMMa system is designed to be flexible and extensible such that it can be applied in many application domains. Events can have multiple participants who are in a social network. The relations between participants in the network can be used to find which users may be interested in an event or to share an event with a clique in a social network. Since the participants of an event are a descriptor of an event, the social context of the event is inherently captured by an event-based system. Events provide an elegant abstraction of the real world that makes it easier to manage applications dealing with real world data. Events encapsulate the semi-structured nature of this type of data and they represent the structure of human experience. Research in cognitive neuroscience and philosophy has shown that humans think in terms of events. Thus the event-centric approach can be considered intuitive and a natural for systems that connect humans to real world data.

In contrast to the media-centric approach, the event-centric approach puts the actual experience of the users in terms of events in the focus. An event describes among others when and where an experience occurred and who participated in this experience. Media files may be considered as documentary support for an event and any media data of any type may be compatible with the system. The event-centric application, thus, is media aware but also media agnostic. Events can contain multiple media files of different types. Event-centric systems can inherently support the different media types as well as other kinds of sensor data and thus, are a suitable candidate for unified indexing of cross-media types. This is in contrast to many media-centric systems which when considering more than one media type, index each media type separately.

Generic Event Model E

Referring to FIG. 1, a generic event model E 101 is proposed that is flexible and extensible to diverse media applications to construct an environment for building event relationships. Events in the generic model allow descriptors of arbitrary complexity including event aspects such as spatial, temporal, structural, informational, experiential, and causal. The event model covers not only multimedia and sensor data, but also concepts to which events are related. The model allows for use of events and descriptors in the specific application domains.

Event model E 101 defines a common data structure for managing and storing events. One exemplary model has been designed considering the events used in various domains like research publications, personal media, meetings, enterprise collaboration and sports. E functions by defining the common characteristics of all events and is necessarily abstract. E then, should be adapted to the needs of each event-based application in which it is used.

Events and Other Occurrences

The primary objects in E 101 are separated in Events 120, Descriptors 125, and Entities 130. Events subsume Telic events 165, (atelic) Activities 135, and Constellations 145. They are first-class entities and do not need any other supporting data. Telic events are tending toward an end or outcome whereas the atelic activities or short activities are describing processes. A constellation represents an association of arbitrary complexity between two or more occurrences. Since such a discovered association may be a significant occurrence itself, constellations are considered as event-like. Constellations may be used, e.g., to model composite events by associating the component events. Such composite events may contain additional descriptors to further define the type of the composition.

Event Descriptors

The descriptors 125 of an event are second-class objects existing to describe an event. Each descriptor may describe one aspect of an event. E allows for an attribute value 190 which may be an arbitrary object. This may be used to add a descriptor of any type to an event. Applications that use the event database may extend the generic model by providing specific types of attribute values.

Entities and External Information

E 101 also allows event data to be linked to external references called entities 130. Entities are of two types, concepts 170 and sensor data 140. Concepts may be attached to an external knowledge reference source 185 and may describe some abstract entity in the domain of the event. Events 120 can also be linked to concrete physical data using the sensor data entity. SensorReferences 150 to sensor data can store among other items, access information, media type, and size.

Event Types

The event structures provided by E 101 are abstract. An event type is a specific structure of the relationships between a set of classes. The event type describes an event 120 and its associated descriptors 125, their types and the constraints on the values of those descriptors. Consequently, an event of a given event type are the objects of the classes defined in the event type within the corresponding structure of relationships. Thus the event can be said to be an 'instance' of the event type. Event types allow defining relationships between different events in a concrete domain. They can be used to build hierarchies and ontologies. E can provide defining inheritance relationships between different event types. For example, an event type "vacation" can be specialized among others towards a "beach holiday" event type and "activity holiday" event type. For example, a one week holiday on Hawaii is an instance of the "beach holiday" event type whereas a safari tour is an "activity holiday". There can be other kind of relationships such as before, after, same participants, and others. Inheritance between event types is a means to structure the events that can happen in a specific domain.

Figure 2:
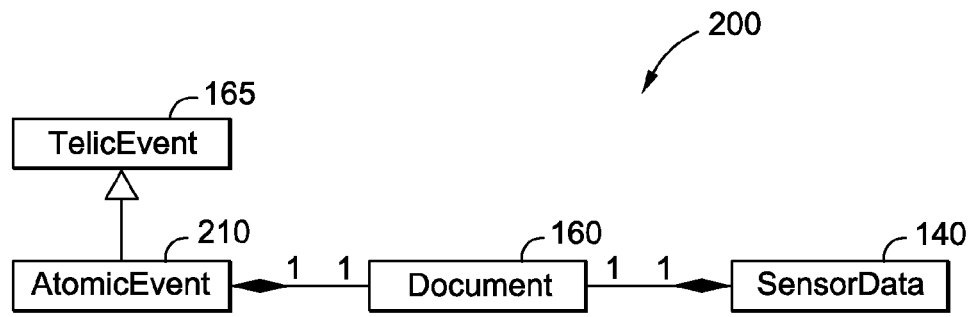
FIG. 2 is a block diagram showing an atomic event type.

Referring to FIGS. 1 and 2, a definition of an atomic event type 200 is shown (FIG. 2). Atomic events 210 which are derived from a TelicEvent 165, are the simplest form of events of which all other, more complex events are composed. The descriptors 125 of atomic events are real world data and metadata. Thus, atomic events can be considered factual. An atomic event can be linked to sensor data 140. Thus, in the domain of media management an atomic event can be linked to a media asset. For reasons of convenience, E allows the storage of multiple versions of the same media element in SensorReference 150 objects. These SensorReference objects point to the actual media asset and may differ, for example, in resolution and storage location. This allows applications to, for example, use a thumbnail of an image for fast display of events and using a full resolution of the same image for processing. Or, if a specific media storage location is not accessible, it can use an alternate storage. For reasons of clarity, the classes common to the generic event model shown in FIG. 1 are omitted in this and all further event type diagrams.

Figure 3:
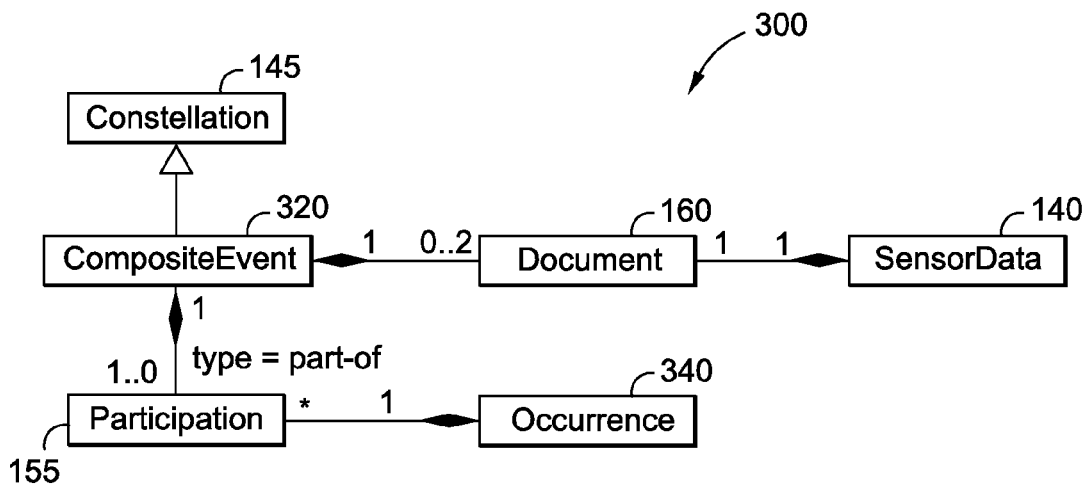
FIG. 3 is a block diagram showing a composite event type.

Referring to FIG. 3, a definition of the composite event type 300 is shown. Constellations 145 are one powerful means to define events. In order to harness this power while ensuring utility, the constellation class must be extended and restricted. Composite events 320 are just such an extension of a constellation that can be used to express the "part-of" relationship between events. Composite events can be distinguished based on their level of complexity. Simpler, application-independent compositions are called elemental events. Events that are semantically recognized by the users of the application are called domain events. Application-specific composite event types can be defined by enumerating the event types of which it is composed as well as the relations between them. In general, events can be related in composite events by attributes that allow for defining part-of relationships such as time, location, and participants. The latter are either people or objects. In constellations, events can also be linked by dependence or causal relationships. Dependence exists when one event must occur for another to occur, e.g., 'eat cake' can only happen subsequently to 'bake cake'. Causal exists when an event occurrence ensures another event, e.g., 'kick ball' causes 'ball moves'.

Compositions of media to a multimedia presentation such as a slideshow can be considered a media-centric attempt to create such domain events. However, abstracting from the actual media data to the events to which the media is associated, the composition of coherent multimedia presentations can also be considered as composing events. The event model allows us to formalize the semantics that lead to such compositions.

Media Event Model

Figure 4:
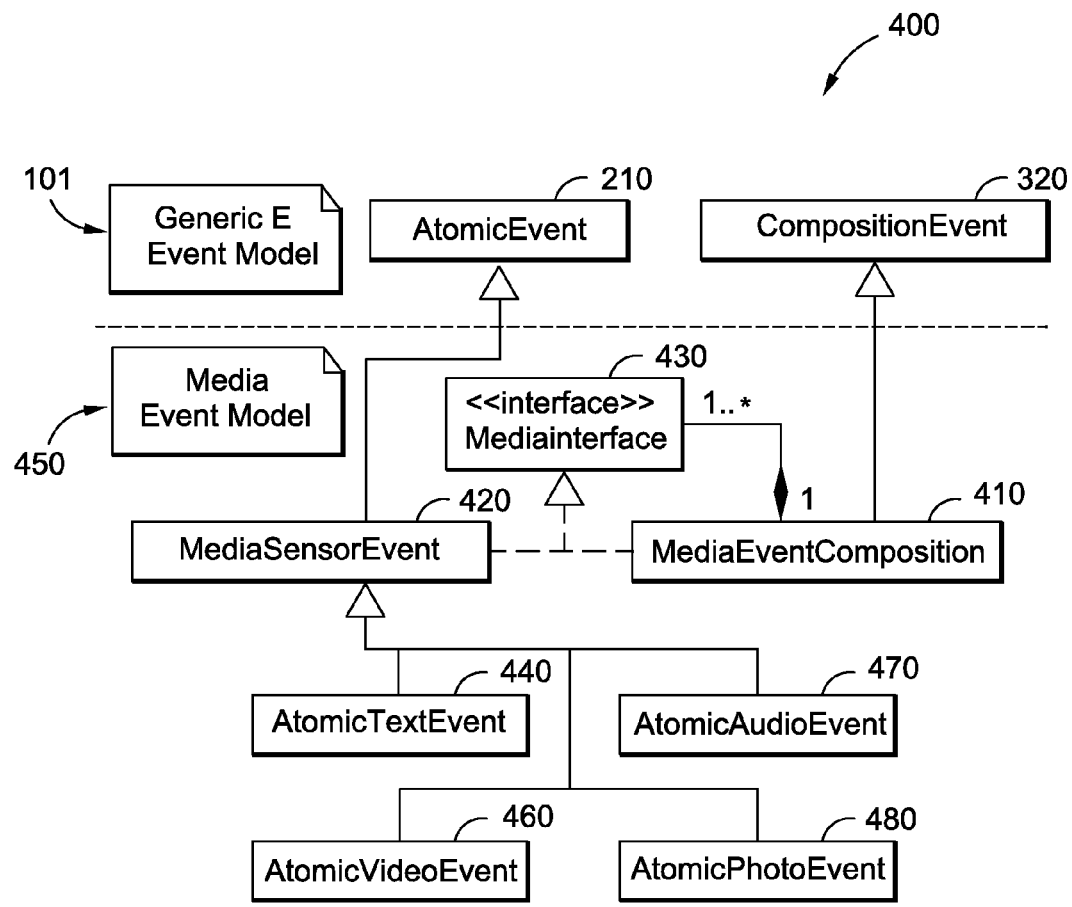
FIG. 4 is a block UML diagram of E extended for media management according to the invention.

With reference to FIG. 4, in the context of media, a UML class diagram 400 of generic event model E 101 specialized for media management is shown. In order to provide support for an event-centric media management application, the generic event model E defined in the previous section must be extended and specialized towards a media event model 450. This is conducted by defining application-specific event types for media management and by determining common descriptors for these media event types. The simplest events in the domain of media management are the AtomicTextEvent 440, AtomicAudioEvent 470, AtomicVideoEvent 460, and AtomicPhotoEvent 480 that occur when a media asset is captured. They are derived from the common superclass MediaSensorEvent 420, which is an atomic event provided by the generic event model E. Since a popular form of personal media storage uses photographs, the following description will concentrate on the storing of photo events. While the present invention is described for use in the context of photographic media, it will be understood that other media type applications can follow the same modeling using analogous descriptors.

Common Descriptors

Figure 5:
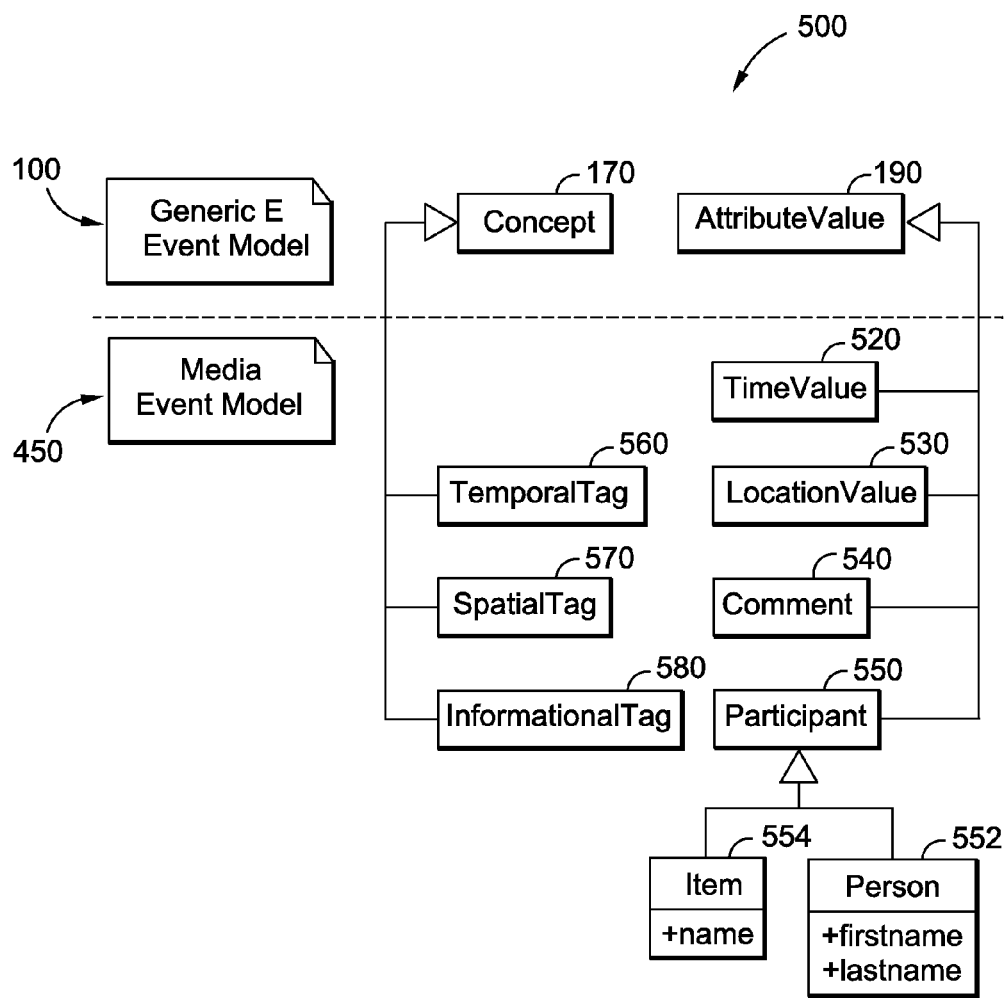
FIG. 5 is a block UML diagram of common descriptors for media management according to the invention.

Referring to FIG. 5, some descriptors may be common to all events of an application. As depicted by the class diagram of common descriptors 500 for media events, all events may contain participant people and objects as well as comments. All events may also contain tags, either manual or automatically generated. Contextual tag attributes can be organized into tag classes such as TemporalTag 560, SpatialTag 570, and InformationalTag 580 to define a Concept 170. Content information such as Timevalue 520, Locationvalue 530, Comment 540, and Participants 550, which include can subclasses Item 554 and Person 552 contain data contributing to an AttributeValue 190. These tags may represent conceptual times like 'Christmas' or locations such as 'New York City'. Using the elements of the generic model, these tags may be stored in references to concepts that link to external knowledge sources like Getty's Thesaurus of Geographic Names. Classes such as Comments, Participants, and Items are created to store their corresponding attributes.

Atomic Events

Figure 6:
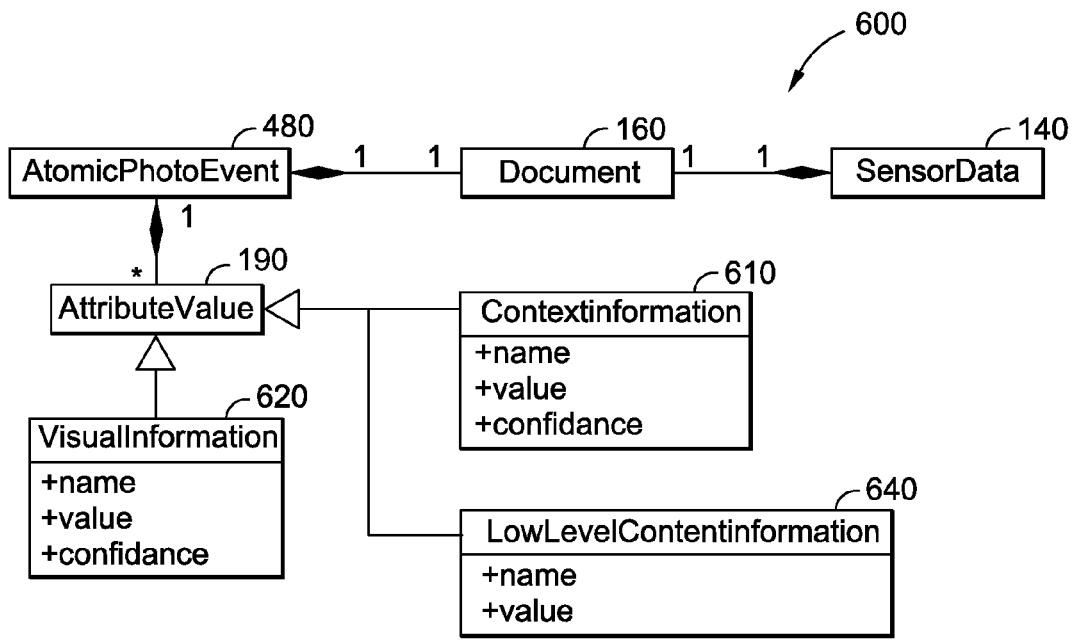
FIG. 6 is a block diagram showing an atomic photo event type.

Referring to FIG. 6, an atomic photo event type 600 is shown. The simplest event types are the atomic media event types. They describe the creation of a sensor data 140 element and its metadata. Atomic video, audio and text event types are defined similarly.

The atomic photo event type 600 contains metadata specific to photographs. For this application, context information is stored extracted from EXIF tags, low level content information like color histograms and textures, and high level content information in the form of visual characteristics like visual words. Since the type of information stored in EXIF tags is all strings, ContextInformation 610 stores name-value pairs. LowLevelContentInformation 640 stores vectors of real number that may represent color or texture characteristics. VisualInformation 620 stores vectors of IDs of the visual characteristics.

Composite Events

When determined to relate to one another after derivation from a constellation, a composition of events may be stored in a class. Referring back to FIG. 4, one such class is the MediaEventComposition 410, which is derived from CompositeEvent 320 of the generic event model E 101. In general, a constellation may contain any event, for example, an atomic event, a composite event, and a constellation. However to make sure that only media events an interface called MediaInterface 430 is defined. Both MediaSensorEvent 420 and MediaEventComposition implement it. Then the composition may be constrained to only those classes that implement MediaInterface, in other words, media events.

Figure 7:
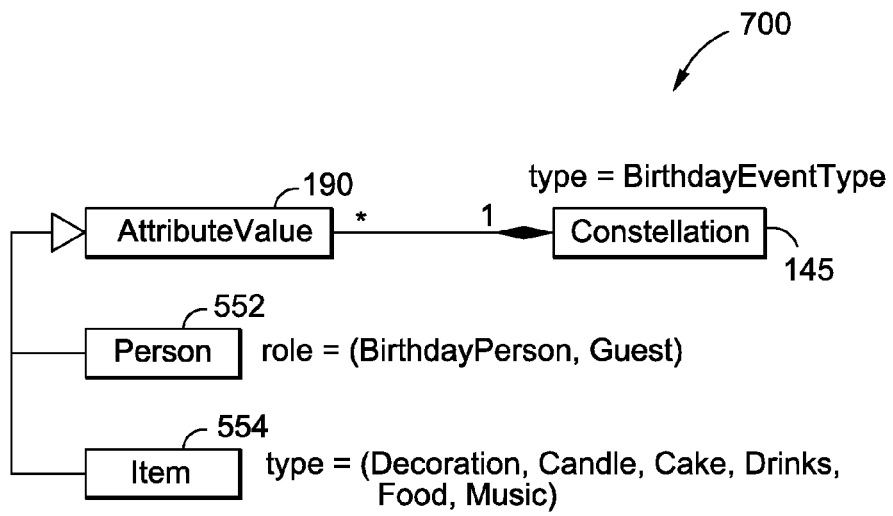
FIG. 7 is a block diagram showing a birthday party event type.

Referring to FIG. 7, an illustration of such an event application uses an example of a composite event type such as a birthday party event type 700. It has attributes specific to a birthday party, e.g., the person whose birthday is being celebrated is held in class Person 552. Other attributes are objects like cake and candles that are characteristics of such events associated with the class Item 552.

EMMa Architecture

Figure 9:
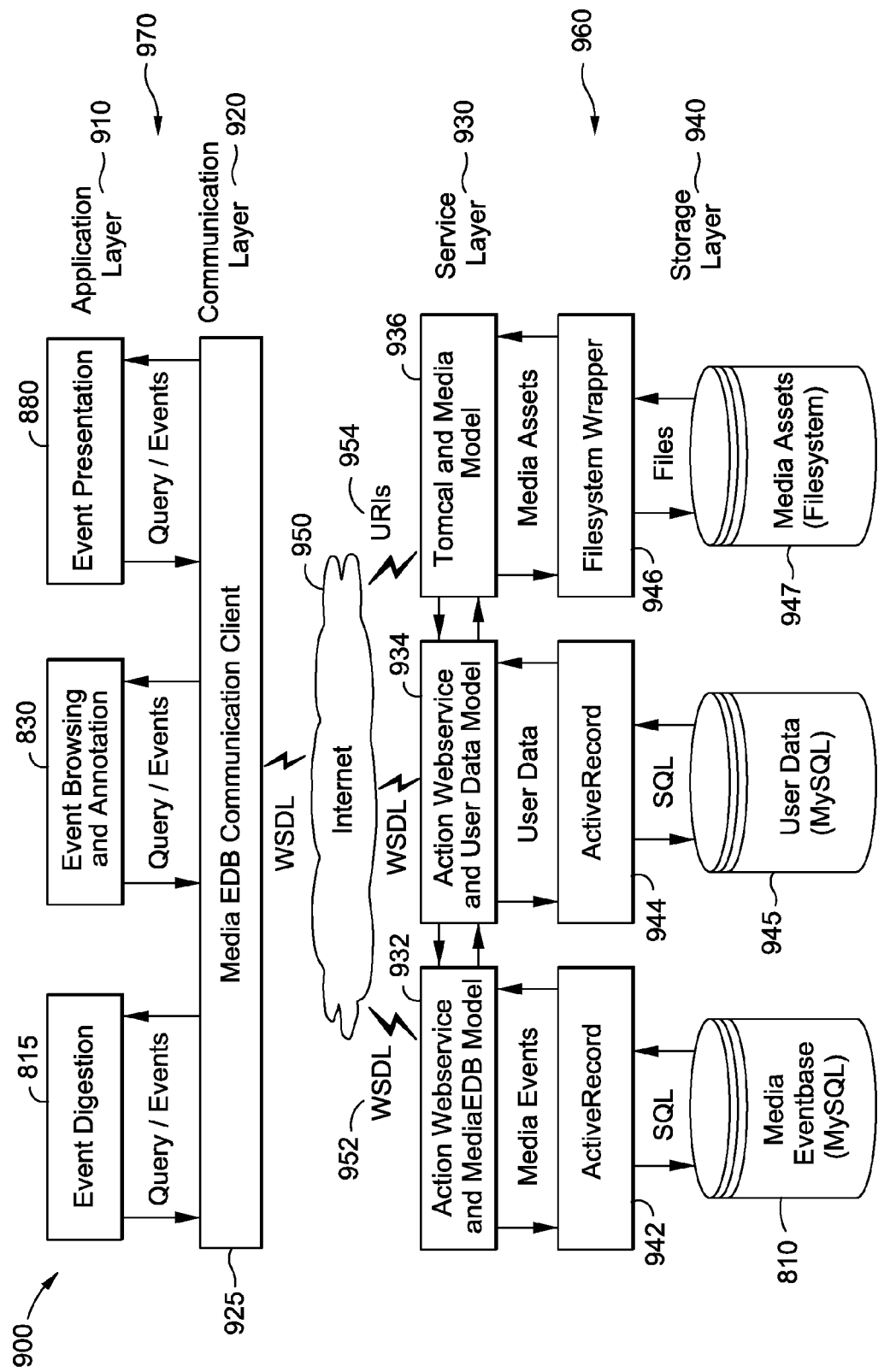
FIG. 9 is a block diagram showing an architecture of the media management application.

An embodiment of the EMMa architecture 900 is shown in FIG. 9. It consists of several layers, each realized as distinct software component. This allows for an easy substitution of a single layer without affecting the functionality or implementation of the other layers. This architecture of our media management application is described in the following along its layers from bottom to top.

The server side 960 of the architecture may be composed of two layers—the Storage Layer 940 and the Service Layer 930. The Storage Layer may provide for three different databases: the Media Eventbase 810 for storing and managing media events, a Media Assets database 947 for storing and managing the media data (assets) associated with the events, and a User Data database 945 for storing and managing user data such as login, password, and access rights to events. This layer also includes three wrappers that abstract from accessing the databases and provide services to the upper layer. The Active Record framework 942 wrapper on the left hand side abstracts from accessing the media events stored in the Media Eventbase database MySQL. It allows the Service Layer to ingest, retrieve, and manipulate events. In the middle, another Active Record framework 944 wrapper abstracts from accessing the user data. For storing the user data, another MySQL database is used (the User Data database). The events stored in MySQL are converted into objects by using Active Record. Active Record implements an interface, which is used by the Action Webservice and MediaEDB Model 932 component. By this, the Storage Layer may change if necessary without touching the upper layers. The Filesystem Wrapper 946 in the right hand side abstracts from accessing media content assigned to the events. Thus, the media data that are describing the events are stored separately from the media eventbase database. The reference between the events and the media data is built by using URIs 954 (Universal Resource Identifier) pointing to the media content. This allows the use of different media storage mechanisms without changing the event server. Each of these storage mechanisms could be optimized for a specific media type. A file system may be used for storing the media content. This means that all the media content associated with events are stored in distinct folders of a filesystem such as a Tomcat web server 936.

On top of the Storage Layer 940 resides the Service Layer 930. This layer provides access to the media events, userdata, and media assets from the Internet 950 via the Action Webservice and MediaEDB Model 932 component. It implements the media event model and provides via Action Webservice functionality such as storing atomic events and composite events, retrieving events, deleting events, and updating events. This component is implemented by using an internet application framework such as Ruby on Rails. The functionality is provided by way of example clients exchanging the event information in form of XML documents using for example, WSDL 952 web services.

For access control and authorization purposes, the Action Webservice and MediaEDB model 932 component also connects to the Action Webservice and User Data Model component 934. The Tomcat and Media Model 936 component provide access to the sensor data of the media events, i.e., the media data files such as photos and videos. Like the component for accessing the media events, the Tomcat and Media Model component also use the Action Webservice and User Data Model component for access control and authorization purposes.

The client side 970 of the EMMa architecture may include a Communication Layer 920 and an Application Layer 910. The Communication Layer may be provided by the Media EDB Communication Client component 925. The component 925 may control the communication between the upper Application Layer and the lower Service Layer 930. The overall goal of the Communication Layer is to provide an easy to program interface for accessing the media eventbase 810, userdata database 945, and media assets storage 947. The Media EDB Communication Layer converts media events retrieved in a markup language such as XML format from the Active Webservice and Media EDB 932 component into Java objects and vice versa. At the same time, it allows clients to access user data and media storages. For accessing both, it can provide and request appropriate user login and password information. Thus, the Media EDB Communication Layer unifies the access to the media events, user data, and media assets for the event-centric media management functionalities of the Application Layer.

Figure 8:
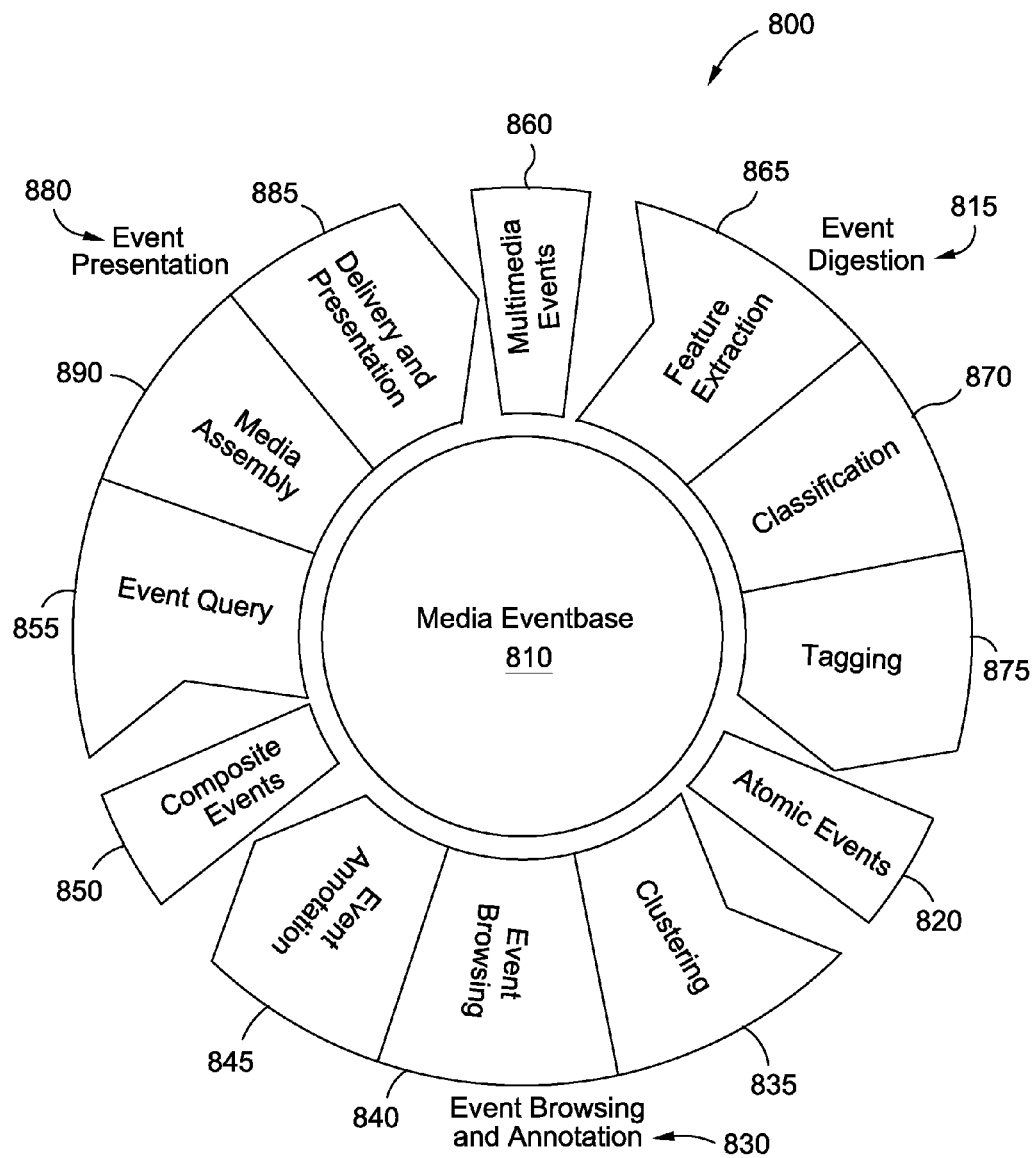
FIG. 8 is a pictorial diagram showing a media event management cycle according to the present invention.
Figure 10:
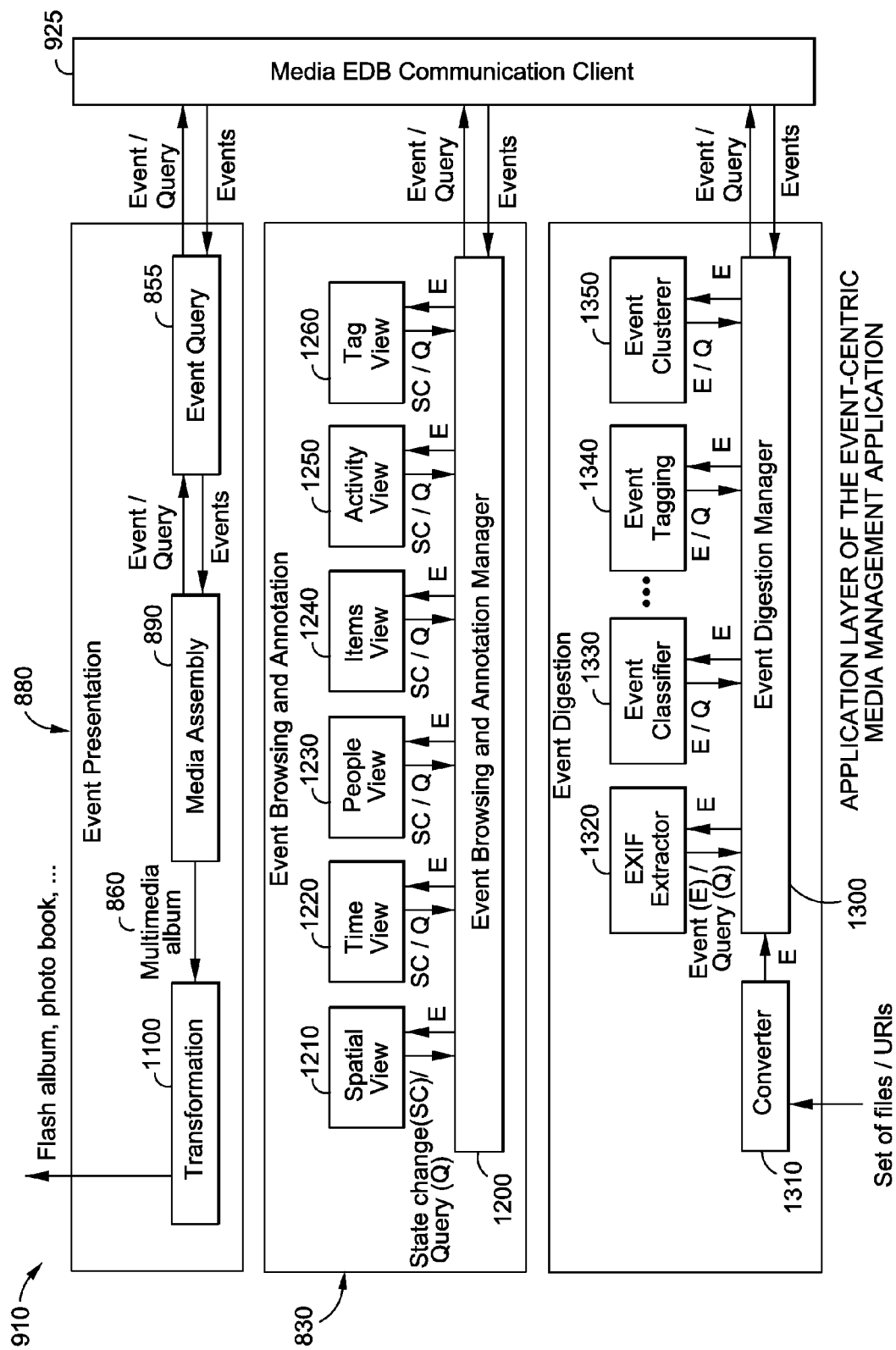
FIG. 10 is a block diagram showing an architecture of an application layer according to the invention.

Referring to FIGS. 8-10, the Application Layer 910 may provide the user interface of the EMMa architecture and consists of three components for Event Digestion 815, Event Browsing and Annotation 830, and Event Presentation 880. These components correspond to the three phases of the media event management cycle 800 (FIG. 8). Each component may have several subcomponents as the architecture of the Application Layer in FIG. 10 shows. Initially, a batch of media assets is converted into atomic media events through the Converter component 1310. These atomic media events go through an Event Digestion Manager 1300 that enriches them with metadata such as EXIF, classifications, and tags. In addition, event clustering is conducted (either on the initial batch of atomic media events only or on all media events stored in the eventbase). The Event Browsing and Annotation Manager 1200 component allows for interactively exploring the media eventbase 810. It is supported by six view components each providing a distinct view on the media events. Example views are spatial 1210, time 1220, people 1230, items 1240, activities 1250, and tags 1260. Finally, the event presentation is provided by the components for Event Query 855 and Media Assembly 890 that select events from the media eventbase and organizes the associated media assets into a multimedia album 860. This album is transformed by the Transformation 1100 component into contemporary presentation formats like SMIL, SVG, and Flash and is delivered to the users for consumption. Finally, the events used for the multimedia album create a new composite event that is stored back in the media eventbase.

Application

Referring to FIG. 8, an exemplary event management cycle 800 is depicted. It consists of several processes, organized in three phases of Event Digestion 815, Event Browsing and Annotation 830, and Event Presentation 880. In the phase of Event Digestion, users initially add new media content to the system such as a set of new photos taken or video clips recorded. For each media asset, a new atomic media event 820 is created and ingested into the media eventbase 810. These atomic events are digested and enriched with metadata by applying enrichment processes such as Feature Extraction 865, Classification 870, and Tagging 875. In the Event Browsing and Annotation phase, the initially created atomic events are assembled into composite events. Here, among others, techniques such as spatial clustering and temporal clustering may be applied in the Clustering Process 835 to group the atomic events into composite events 850. In addition, clustering among other dimensions can be conducted such as color histogram or face detection. The Event Browsing process 840 allows for interactively exploring the media eventbase, manually refining these composite events and defining new ones. In the Event Annotation process 845, users assign an event type to the composite event, e.g., birthday party, dinner, or meeting. In addition, the parameters of the type assigned are filled in with concrete values. In the Event Presentation 880 phase, the media events and their associated media assets are leveraged for creating multimedia event albums 860. Multimedia albums are an extension of traditional page-based photo books with support for continuous media types such as audio and video and navigational interaction in form of hyperlinks. For creating a multimedia album, appropriate media events are first selected by the Event Query process 855. These can be atomic ones as well as composite events. Then, the associated sensor data of the media events, the media elements are assembled into new multimedia content in the Media Assembly process 890. In one example, the media elements are arranged by time and space into a coherent multimedia presentation, such as a media album. The multimedia presentation is delivered to the end user for consumption by the Delivery and Presentation process 885. The events used for assembling such a multimedia presentation can be considered as a new composite event. Thus, this event is stored back in the event database together with the multimedia presentation as its sensor data.

Event Ingestion and Digestion

Figure 14B:
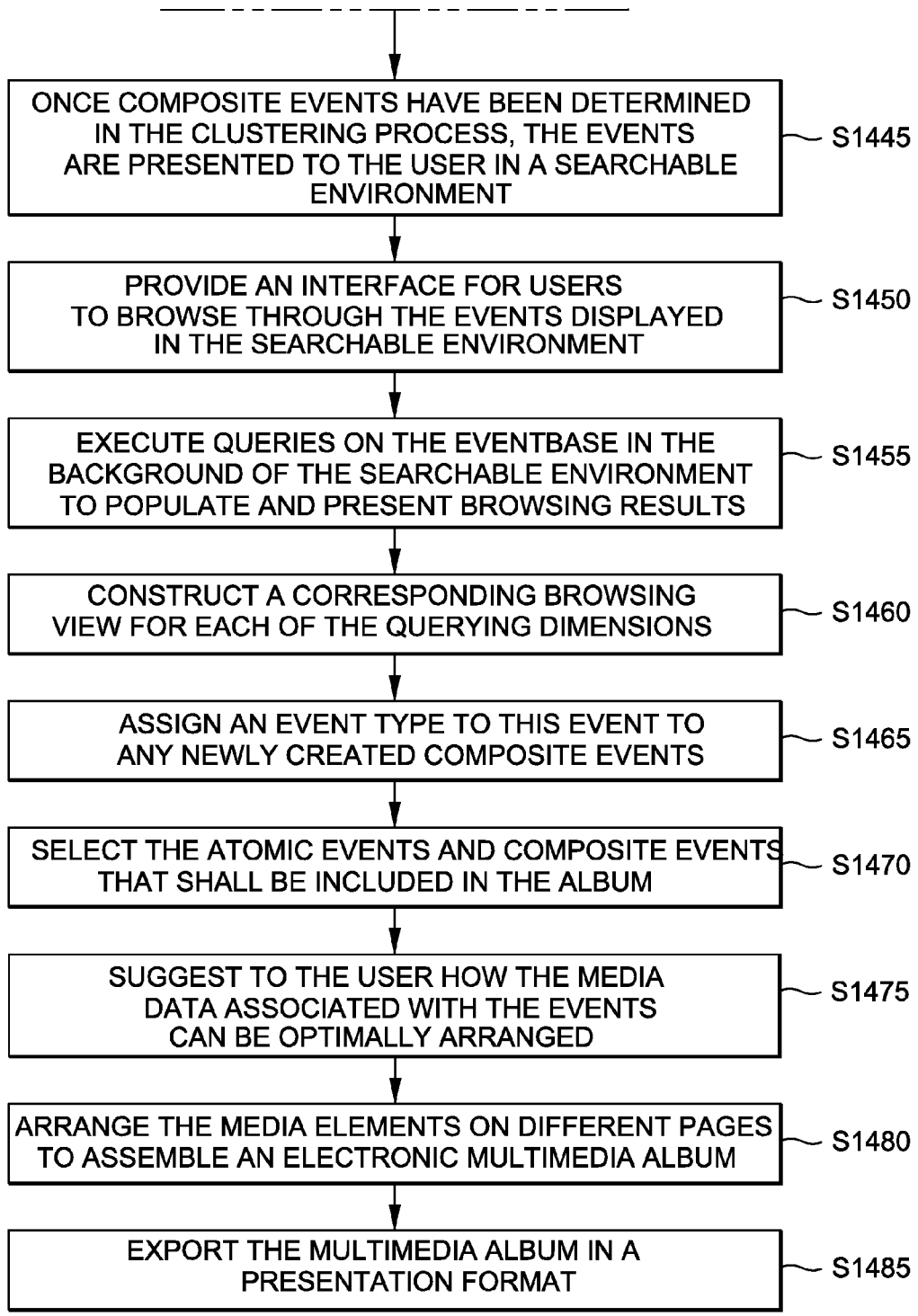
FIG. 14 schematically represents a series of steps involved in a method for organizing and presenting digital media according to another embodiment of the invention.

Referring to FIGS. 8 and 14, the first phase of the generic media event cycle ingests and digests new atomic events scanning for attributes. During the Event Digestion 865 phase, files can be enriched with further metadata. The users select via a file dialog a folder with media content that shall be ingested as atomic events into the application. The application scans the files in this folder and applies the processes of Feature Extraction 865, Classification 870, and Tagging 875 on it.

Feature Extraction

When new media assets are ingested as atomic events into the eventbase 810, some feature extraction algorithms are applied to enhance the events with basic metadata (Step 1410). The media assets are processed to extract their context information and content information (Step 1415). For example, for photos, the content information is in the form of color histogram and texture Context information is retrieved from the EXIF headers which contain among other data, camera settings, time, and location.

Classification

Based on the results of the feature extraction, the ingested atomic media events may be classified (Step 1420). For example, for atomic photo events image retrieval and classification based on the automatic camera settings retrieved from the EXIF headers may be used. With automatic camera settings the optical parameters such as focal length, aperture, and exposure time may be retrieved.

This classification may be conducted by applying unsupervised learning algorithms to cluster images (Step 1425). The optical parameters of a particular photograph are used to compute a light metric and its depth of field. A training set of 2500 photographs were hierarchically clustered using these two parameters. These photographs were also manually annotated with 50 overlapping classes. The optical characteristics were able to differentiate many classes. The classes with the highest likelihood for a given photo are used to annotate the corresponding event. These classes are provided to the user in the next step as suggestions that the user may ratify or reject.

Tagging

Having conducted Feature Extraction and Tagging, there is an optional Tagging process of the atomic media events. Tagging may include manually adding keywords to the atomic events (Step 1430). The user may also accept or reject the classes automatically detected in the Classification step (Step 1435). Tagging information added to the events includes describing the activity shown in the event, location of the event, and other context data. Tags for describing different aspects of events are stored separately, i.e. location tags are clearly differentiated from informational tags that describe the content of media.

Event Browsing and Annotation

Once the atomic media events are successfully ingested into the media event database and the event is digested in terms of having added content information and context information, the atomic events are passed to the next phase of the media event cycle. In addition to interactively exploring and annotating the media events, the purpose of this phase is to determine further composite events. This phase is the Composite Event Detection and takes care of creating composite events of the just ingested atomic events. With each set of newly ingested atomic events, at least one composite event is created. This composite event comprises the ingested atomic events as its parts. These composite events are determined manually, semi-automatically, or even fully automatically. While focus is demonstrated on the manual and semi-automatic determination and creation of semantically valid composite events, it will be understood that automatic determination and creation is also contemplated.

Clustering

A semi-automatic creation of composite events is conducted in the Clustering process where atomic media events are grouped according to specific dimensions such as time and space into clusters (Step 1440). In practice, events are hierarchical and range from elemental level to domain level. These clusters eventually determine hierarchical composite events.

The events determined are generally of high-level and time information is an important dimension used to calculate them. Therefore, some exemplary algorithms are designed based on time information. In addition to the high-level domain event detection, low-level elemental event detection may be supported.

In elemental event detection, an approach includes combining both time information and visual information in the form of a color histogram in event detection. The time difference and visual dissimilarity between two successive photo events are compared and then combined together. Then a hierarchical agglomerative clustering method is used to generate event structure. At different levels, the weights of time difference and visual dissimilarity vary accordingly. On a domain level, a spatial clustering of the events based on GPS information may be pursued.

As initially introduced, the Clustering process is semi-automatic. In other words, after applying various algorithms to cluster the events along different dimensions, the automatically calculated clusters are presented to users who may choose to modify and save them. Once the users save these clusters, new composite events are created for each cluster. This procedure can then be repeated to generate composite events at different levels of granularity.

Event Browsing

Once composite events have been determined in the Clustering process, the events are presented to the user in a searchable environment (Step 1445). The users can navigate through the events in the database in a blended querying and browsing approach on a screen interface with the searchable environment. This means that while the users are browsing through the events displayed on the screen (Step 1450), queries on the eventbase 810 are executed on in the background (Step 1455) to populate and present the browsing results. Both steps, the querying and browsing, are conducted in small turns. Thus, the users of our media management application perceive the navigation through our database as smoothly navigating through the events.

Figure 11:
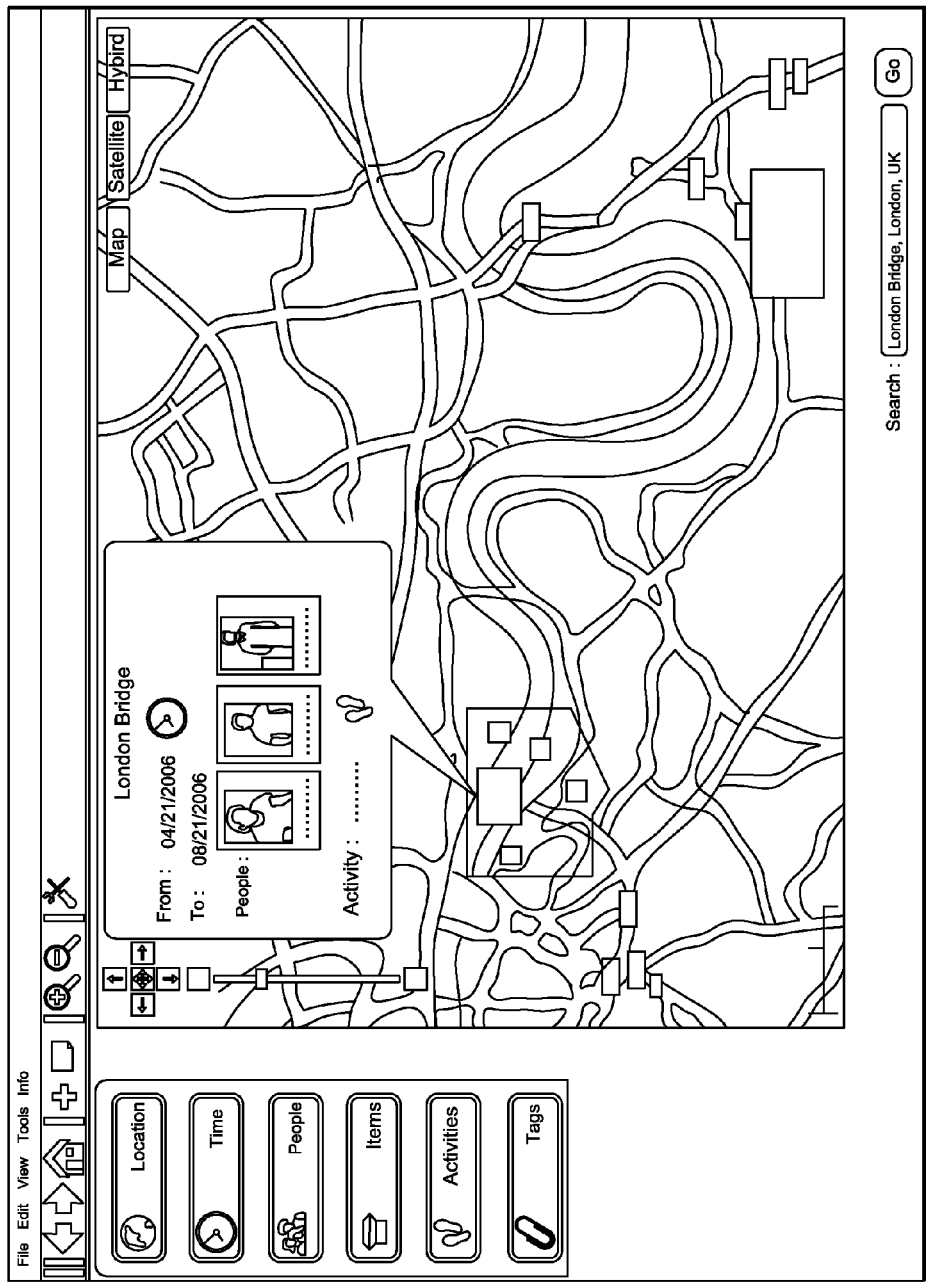
FIG. 11 is a computer screen image showing a location view of events.
Figure 12:
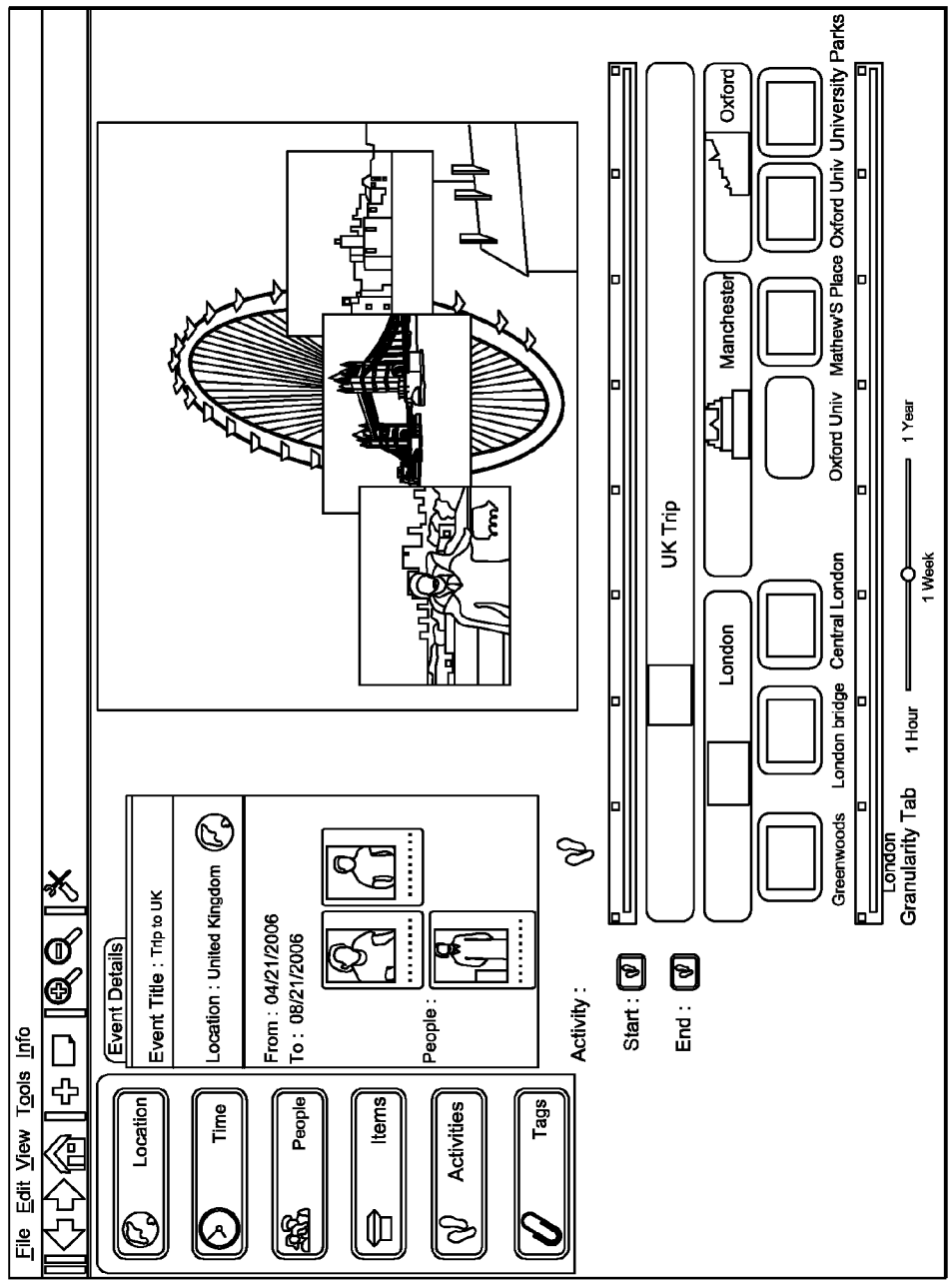
FIG. 12 is a computer screen image showing a timeline view of events.

The users can browse through the events according to different querying dimensions. These dimensions are for example, the events' time, location, participants, used or displayed items, activities, and tags. For each of the querying dimensions, a corresponding browsing view is constructed (Step 1460). For example, referring to FIG. 11, location events are visualized using a map. The map can be searched by either manually panning the map or searching for locations by name. Composite media events are shown on the map as polygons that outline their spatial extent. Atomic media events of a composite media event are shown as icons within the polygons. Clicking on an event's thumbnail brings up other details like participants and time. Referring to FIG. 12, if a time view is selected, a timeline is chosen to present the events in chronological order. It also shows the events one level above and one level below the current media event to establish its context. The events' details, the media assets related to them, and their component events are displayed above the timeline. In another view, for example, presenting the relations of the participants in events can be visualized employing a social network graph.

Another convenient aspect of the user interface is the provision for a blended querying and browsing in the eventbase 810 by transitioning between the different views. For example, once a user has selected a time span in the timeline-based view of the events, he or she can switch to a map presentation of the events in this time span. Once in the map-based view, the users can click on one of the events to get information about the activity, items, or participants in this event. Thus, the querying and browsing process effects an intelligent and smooth integration of the different views on events in one interface. The blended browsing and querying is not only used for exploring the eventbase 810 but also to further group atomic media events into composite events, i.e., to put the atomic events into relations. These newly created composite media events can optionally be annotated in the Event Annotation process using predefined event types.

Event Annotation

Having created new composite events, an event type can optionally be assigned to this event (Step 1465). For our event-centric media management application, more than forty different event types are defined including for example: birthday, conference, meeting, dinner, and others. Once an event type is selected, the parameters defined in this type are filled in with concrete values extracted from the composite event such as the birthday child or participants of the meeting. This is done automatically for parameters that have a clearly defined part-of relationship like time, location, people, and items. For other more ambiguously defined event type parameters, a semi-automatic or even manual approach will rely on the input from the user for filling in the concrete values. Additionally, the Event Annotation process can be extended by arbitrary event types.

In addition to the described manual annotation of composite media events by the users, event types may be determined (semi-)automatically in a bottom-up approach. An event type can be determined based on the atomic events used for a composite event. The atomic events are analyzed. Based on the characteristics and structure of the atomic events, the appropriate event type is (semi-)automatically assigned.

Event Presentation

In the next phase, Presentation Authoring, the created events may be used to assemble a presentation. The Event Presentation phase consists of the three processes Event Query, Media Assembly, and Delivery and Presentation. Multimedia presentations are created in the form of electronic multimedia albums. These albums are composed of the media associated with the atomic events and composite events stored in the eventbase. Multimedia presentations can be created in the form of page-based multimedia albums. These albums may be composed of the media assets associated with the media events stored in the eventbase. A context-driven authoring tool for creating page-based multimedia presentations can be adapted and enhanced for processing media events and creating multimedia albums based on the events' media assets.

Event Query

The first step for creating a new multimedia album based on the media data associated with the events in our database is to select the atomic events and composite events that shall be included in the album (Step 1470). For it, query parameters are specified for selecting the appropriate events. The result is a list of events that fulfill the query. This list can be ranked according to the query dimensions. It is then used as input to the Media Assembly process.

In addition to this event query step, a smooth switch can be made from the blended Querying and Browsing process to the Media Assembly process. This means, once the users are in a specific view of Querying and Browsing the events, they can switch by one click to the Presentation Authoring features and use the latest browsing view as input to the Media Assembly.

Media Assembly

Once the events are selected for creating the multimedia album, the Media Assembly process suggests to the user how the media data associated with the events can be optimally arranged (Step 1475). Additionally, a created album can be targeted at different end devices such as a Desktop PCs, PDAs, and cell phones. The structure of the composite events is used to arrange the media elements on different pages of the electronic multimedia album (Step 1580). This structure is based on among others, cluster information based on time and space or visual information such as color histograms. The media data associated with the composite events are arranged in time and space on different pages of the electronic album. Thus, an album can be considered as depicting a series of composite events. Each event represents a sub-album consisting of a certain number of pages. The information available in the composite events of different types may be used to create such sub-albums and pages for the different events. For instance, an event known to be important can be laid out for emphasis. The informational aspect of the events may be used to provide captions to photographs.

Figure 13:
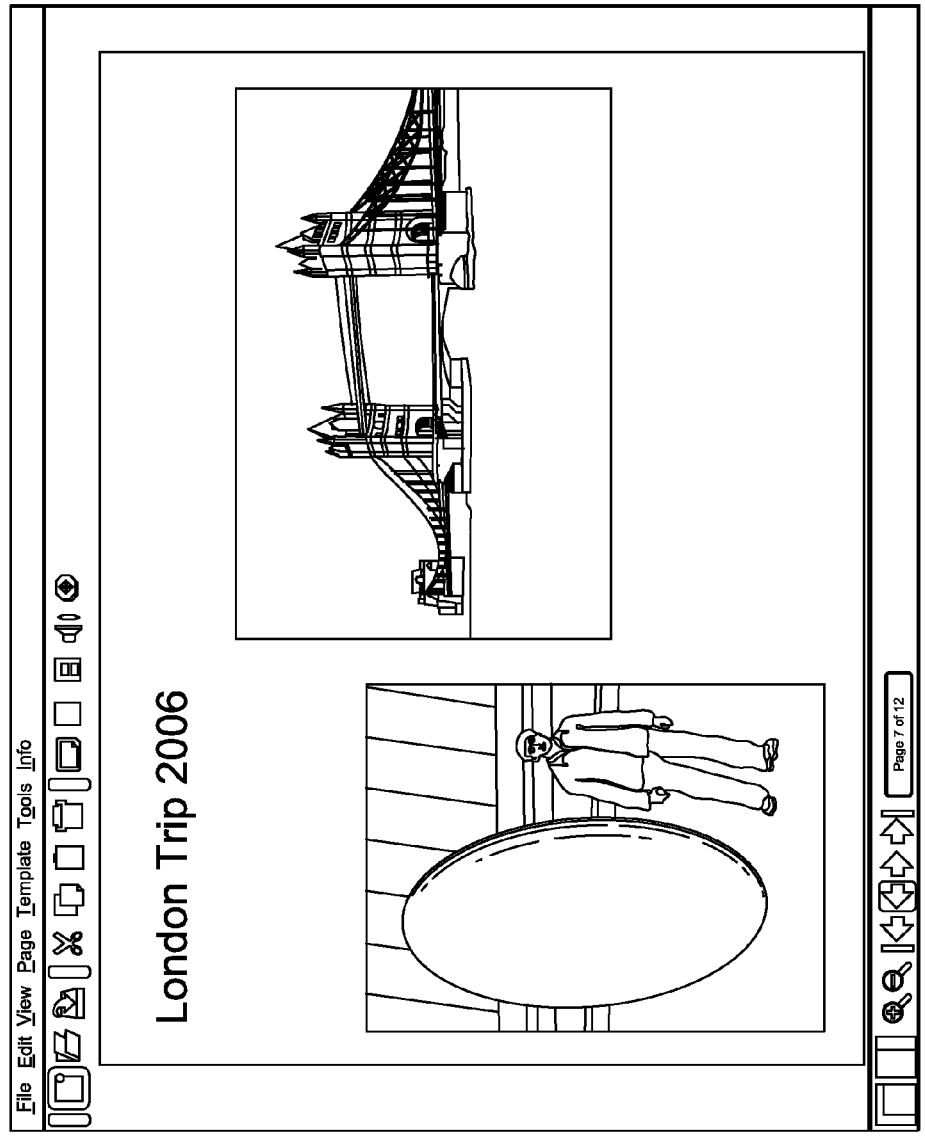
FIG. 13 is a computer screen image showing an authoring of multimedia presentation.

Referring to FIG. 13, a screenshot of a trip to England includes events like sightseeing in London, Manchester and Birmingham. The album would thus have three sub-albums with each spanning a number of pages. After the application has suggested a specific design and layout, users can modify this layout to their satisfaction. Once, the users are satisfied with the assembly result, the multimedia album can be delivered and presented to targeted recipients. This is conducted in the following Delivery and Presentation phase.

Delivery and Presentation

When the media assembly step is finished and a new multimedia album is created, users can export the multimedia album in a presentation format to deliver and present the album to an intended recipient (Step 1485). Support for exporting the album can use presentation formats such as SMIL, SVG, and Flash for delivery and presentation to others.

Once an album is delivered in a specific presentation format to a user, the created multimedia presentation is considered as a new composite event. This means that based on the events used for album, a new composite event is created and stored in the eventbase. This composite event reflects the different events conveyed by the album. A base domain of generic event types is used to describe the semantics of the album in terms of sub-albums and pages. The created multimedia presentation is stored as sensor data to the created composite event. Thus, the temporal course, spatial layout, and navigational interaction defined with the multimedia presentation is stored as part of the experiential aspect of the composite event.

It should be understood, of course, that the foregoing relates to exemplary embodiments of the invention and that modifications may be made without departing from the spirit and scope of the invention as set forth in the following claims.

We claim:

1. A method of cataloguing media files for event-centric organization, comprising:
   scanning media files for atomic events;
   applying feature extraction techniques to the atomic events to obtain context information and content information for each atomic event;
   classifying the atomic events into predetermined classes based on the extracted context and content information;
   presenting, to a user, the classified atomic events for a user's ratification or rejection;
   assembling composite events from the ratified atomic events;
   querying for retrieval of qualified ones of the assembled composite events;
   assigning an event type to the assembled composite events; and
   populating parameters defined for the assigned event type with values extracted from atomic events of the assembled composite events;
   comparing time difference and dissimilarity between two successive events and combining them together; and
   automatically creating clusters of the atomic events with a plurality of levels of granularity.

2. The method of cataloguing media files for event-centric organization claim 1, wherein:
   the context and content information includes assigning metadata tags to the atomic events; and
   the assembling of composite events uses the metadata tags.

3. The method of cataloguing media files for event-centric organization of claim 2, wherein:
   the metadata tags are selected from a group of dimensions including time, location, persons involved, displayed items, and activities.

4. The method of cataloguing media files for event-centric organization claim 1, further comprising:
   presenting the media files in an electronic medium displayed as the assembled composite events.

5. The method of cataloguing media files for event-centric organization claim 1, wherein:
   the media files are photos including EXIF headers containing context information; and
   the content information extracted includes color histogram and texture data.

6. The method of cataloguing media files for event-centric organization claim 1, further comprising:
   a tagging process employing the manual addition of keywords to the atomic events.

7. The method of cataloguing media files for event-centric organization claim 1, wherein:
   the assembling composite events are performed manually, semi-automatically, or automatically, and wherein the event type is automatically assigned using characteristics of the atomic events of the assembled composite events.

8. The method of cataloguing media files for event-centric organization claim 1, further comprising:
   grouping atomic events into composite events using color histogram and visual characteristic event detection of the media files scanning for and comparing time and visual information; and
   arranging media files of the atomic events based on a structure of the assembled composite events.

9. The method of cataloguing media files for event-centric organization claim 8, wherein:
   events are clustered based on global positioning satellite information.

10. The method of cataloguing media files for event-centric organization claim 8, further comprising:
    applying the clustering process to media files of the assembled composite events for determining composite events within the assembled composite events; and
    providing an interface for the user to browse through the assembled composite events;
    wherein the media files include video data and events are clustered based on facial detection information.

11. A system for organizing images comprising:
    a server in communication with a network, the server having an event base database, a user database, a file system, at least three wrappers for abstracting data from at least one of the event base database, the user database, and the file system, and the server having a service layer for storing atomic events and composite events, retrieving atomic or composite events, deleting atomic or composite events, and updating atomic or composite events; and
    a client in communication with the network, the client having an application layer for programming an interface for the client to access event data and media data storage, perform event digestion, and perform event annotation, wherein the client periodically receives user modifications to the composite events, and wherein the application layer includes a query function for retrieval of qualified composite events.

12. The system for organizing images of claim 11, wherein:
    the event base database, user database, and file system employ different media storage mechanisms for optimized data storage and retrieval of different types.

13. The system for organizing images of claim 11, wherein:
    the service layer includes a function for organizing images according to event relationships.

14. A method for using an event-centric management architecture to retrieve media data, the method comprising:
    analyzing media data from at least one source;
    organizing and storing the media data according to events including atomic events into composite events using a library of dimensional tags associated to each of the atomic events;
    assigning an event type to the composite events;
    annotating the composite events with parameters defined for the event type;
    accessing a collection of composite events for display and browsing on a graphical user interface using an initial graphical presentation;
    performing a query-based search on the graphical user interface using predetermined dimensional tags in the library to search for selected composite events;
    switching from the initial graphical presentation to a second graphical presentation to display the selected composite events based on one of the dimensional tags in the library;

using the events to retrieve media data;
  displaying the composite events as polygons that map the spatial extent of the composite events and contain atomic events as icons within the polygons; and
displaying a timeline of the composite events with event details and event media assets displayed above the timeline.

15. The method for using the event-centric management architecture to retrieve digital images of claim 14, wherein:
  the media data are organized according to composite events and include metadata tags describing the activity of said events.

16. The method for using the event-centric management architecture to retrieve digital images of claim 15, further comprising:
  presenting the media data in a multimedia format.

17. The method for using the event-centric management architecture to retrieve digital images of claim 16, further comprising:
  grouping events into multimedia albums for event browsing.

* * * * *